United States Patent [19]
Woods

[11] Patent Number: 5,718,462
[45] Date of Patent: Feb. 17, 1998

[54] MUFFLER TUBE COUPLING WITH REINFORCING INSERTS

[76] Inventor: Woodrow E. Woods, 3640 Fiscal Ct., Riviera Beach, Fla. 33404

[21] Appl. No.: 780,241

[22] Filed: Jan. 6, 1997

Related U.S. Application Data

[63] Continuation of Ser. No. 475,488, Jun. 7, 1995, abandoned.

[51] Int. Cl.⁶ .................................................. F16L 21/00
[52] U.S. Cl. ........................ 285/236; 285/417; 285/371
[58] Field of Search .............................. 285/235, 236, 285/417, 371

[56] References Cited

U.S. PATENT DOCUMENTS

| | | | |
|---|---|---|---|
| 2,356,333 | 8/1944 | Matter | 285/236 |
| 3,087,745 | 4/1963 | Rumbell | 285/236 |
| 3,907,341 | 9/1975 | Schoepe | 285/236 |
| 4,119,334 | 10/1978 | Steed | 285/236 |
| 4,426,106 | 1/1984 | McCoy | 285/236 |
| 4,699,404 | 10/1987 | Drevs | 285/236 |
| 5,328,214 | 7/1994 | Denny | 285/235 |

FOREIGN PATENT DOCUMENTS

| | | | |
|---|---|---|---|
| 678957 | 4/1930 | France | 285/236 |

*Primary Examiner*—Eric K. Nicholson
*Attorney, Agent, or Firm*—Malin, Haley, DiMaggio & Crosby, P.A.

[57] ABSTRACT

A reinforcement insert for use in a coupling components in marine exhaust systems. The insert is generally made of a much stronger material than fiberglass and is inserted within corresponding openings of exhaust system components which are to be coupled. Thereafter, a sleeve and pipe clamps are secured to the exhaust system components and tightened thereon. The inserts prevent fracturing of the coupling area between the exhaust system components and thereby prevent dangerous leakage conditions which could otherwise result in the sinking of a vessel or other undesirable consequences.

2 Claims, 2 Drawing Sheets

MUFFLER TUBE COUPLING WITH REINFORCING INSERTS

This application is a continuation of application Ser. No. 08/475,488 filed, Jun. 7, 1995, now abandoned.

BACKGROUND OF THE INVENTION

1. Field of the Invention

This invention relates generally to exhaust pipe reinforcements, and more particularly to reinforcing inserts which are placed within opposing ends of exhaust system components that are to be connected.

2. Description of the Prior Art

Marine exhaust system components are typically made of fiberglass because of its low weight and corrosion resistant properties. Beginning at the engine exhaust manifold, the exhaust system comprises fiberglass piping, a muffler which may be constructed of fiberglass and other fiberglass components. Each of these components is manufactured separately and are connected together to form the marine exhaust system.

The exhaust system components, including exhaust pipe and muffler, are typically interconnected by the use of pipe clamps. However, fiberglass is a rigid material which fractures when the clamps are tightened too tight. Moreover, invisible internal fractures may initially occur which can go undetected and over time develop into larger fractures. These fractures cause the marine vessel to be susceptible to internal leakage of deadly exhaust gas or leakage of reverse flowing surge water that enters into the exhaust system. Specifically, reverse flowing surge water or cooling water exiting the engine can easily leak through these fractures into the hull of the vessel. Depending on the size of the fracture a significant amount of water can leak into the hull and in the worse case scenario lead to the sinking of the vessel. Accordingly, there is a present need for an exhaust pipe reinforcement that will prevent fractures in fiberglass exhaust system components where pipe clamps are used.

SUMMARY OF THE INVENTION

The present invention provides an exhaust system reinforcement insert for use with marine exhaust systems. The apparatus is characterized by a cylindrically shaped insert which has an outer diameter sized to fit within the inner diameter of the fiberglass exhaust system component it is inserted within. In order to insure proper placement and stabilization of the reinforcing insert within the fiberglass exhaust system component, the insert is flared outwardly at one end.

In use, an insert is placed within each opposing end of a pair of exhaust system components that are to be connected. Next, a rubber sleeve is placed over the outer surface of the components. Finally, clamps are placed over the hose and tightened thereon. However, due to the internal support provided by the inserts, the fiberglass around the connection is less susceptible to fracturing even if the clamps are tightened beyond the recommended torque.

In accordance with the present invention, it is an object to provide an exhaust system reinforcing insert for use in exhaust system component connections.

In accordance with these and other objects which will become apparent hereinafter, the instant invention will now be described with particular reference to the accompanying drawings.

DESCRIPTION OF THE PREFERRED EMBODIMENTS

Figure 1:
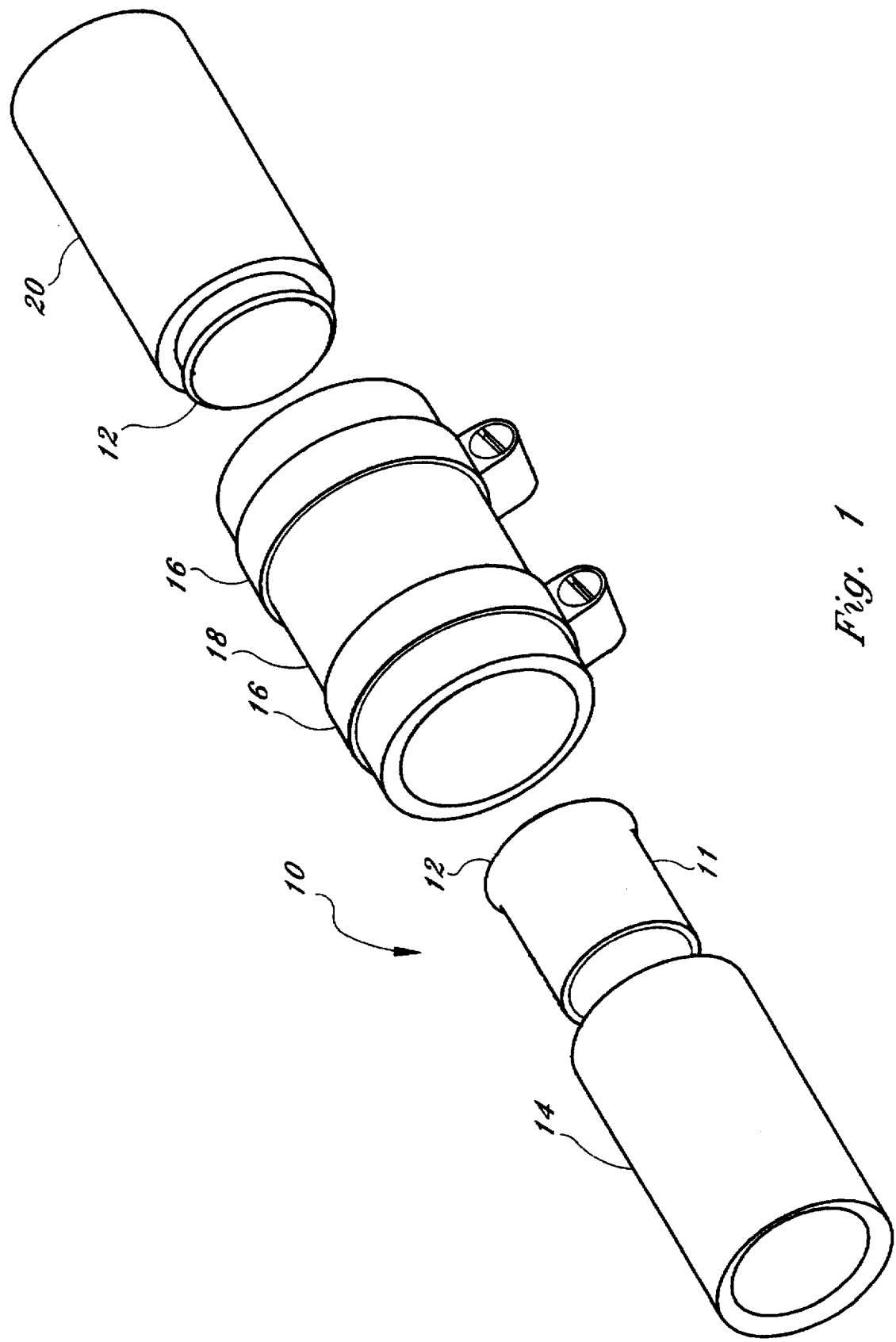
FIG. 1 is a perspective view of the present invention.
Figure 2:
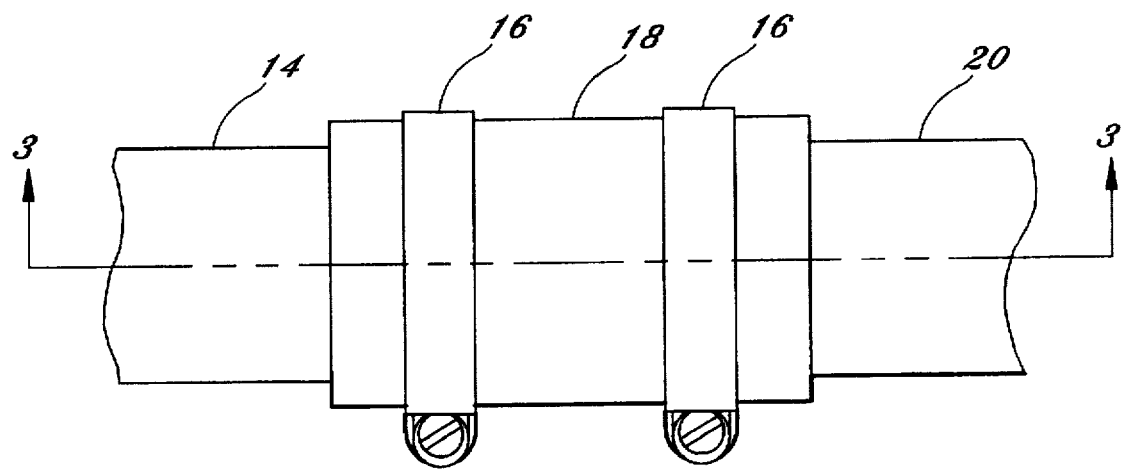
FIG. 2 is a side view of a typical marine exhaust system connection.
Figure 3:
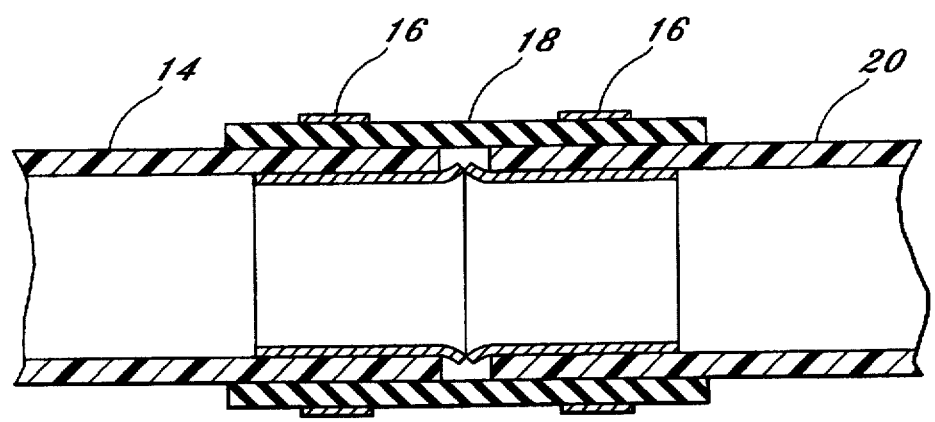
FIG. 3 is a sectional view along lines 3—3.

With reference to FIGS. 1–3, there is depicted a reinforcement ferrule 10 having a flared end 12 and an outer peripheral surface 11. In the preferred embodiment, ferrules 10 are manufactured from stainless steel or other corrosion resistant material and sized such that their outer diameter is less than the inner diameter of the exhaust pipe termination it will reinforce.

FIG. 1 illustrates an exploded view of a typical marine exhaust pipe connection between marine exhaust pipes. One of the reinforcement ferrules 10 of the instant invention is shown positioned within exhaust pipe 20 and another ready for placement within exhaust pipe 14.

In use, a reinforcement ferrule 10 is inserted within an exhaust pipe as shown in FIG. 1 until flared end 12 prevents the ferrule from being inserted any further. Thereafter, a rubber or fiberglass sleeve 18 is placed over the outer diameter of the ends of the exhaust pipes 14 and 20 as shown in FIG. 3. Finally, clamps 16 are tightened to secure sleeve 18 around pipes 14 and 20. FIG. 3 is a sectional view of FIG. 2 along line 3—3. As shown, clamps 16 circumscribe exhaust pipes 14 and 20 such that they are supported by ferrules 10 at all times.

Ferrules 10 are much stronger than the fiberglass components they are designed to reinforce. Accordingly, the ferrules provide an outward resistance when the clamps 16 are tightened around the sleeve. In turn, this relieves the fiberglass from the stresses that could otherwise produce fractures and consequent exhaust leaks and, worse yet, openings which could result in the sinking of a marine vessel.

Although not shown in the figures, the invention can be used to couple several different types of exhaust system components. For example, the ferrule can be used to couple a marine muffler to an exhaust pipe. Similarly, the ferrules can be used when coupling an elbow or any other exhaust system component to other exhaust system components.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An apparatus for connecting a first cylindrical conduit to a second cylindrical conduit, said apparatus comprising a first cylindrical conduit having an inner diameter and an outer diameter, a second cylindrical conduit having an inner diameter and an outer diameter;

a first insert, said first insert being substantially cylindrical and having a first proximal end, a first distal end, a first intermediate portion, and substantially parallel inner and outer surfaces formed about a first longitudinal axis, said first insert surfaces flaring radially outward from said first axis at said first proximal end, said first insert outer surface having a diameter at said proximal end that is greater than the first cylindrical conduit inner diameter but less than the first cylindrical conduit outer diameter;

a second insert, said second insert being substantially cylindrical and having a second proximal end, a second distal end, a second intermediate portion, and substantially parallel inner and outer surfaces formed about a second longitudinal axis, said second insert surfaces flaring radially outward from said second axis at said second proximal end, said second insert outer surface having a diameter at said proximal end that is greater than the second cylindrical conduit inner diameter but less than the second cylindrical conduit outer diameter;

an elongate sleeve, said sleeve sized to circumscribe said first conduit and said second conduit; and a plurality of clamps, said clamps sized to circumscribe said elongate sleeve;

wherein, in use, said first distal end of said first insert is inserted within an end of said first cylindrical conduit and said second distal end of said second insert is inserted within an opposing end of said second cylindrical conduit thereafter said elongate sleeve is placed over said first and second cylindrical components and said clamps are secured around said sleeve thereby securely connecting said first and second cylindrical conduits.

2. An apparatus according to claim 1, wherein said first and second inserts are stainless steel.

* * * * *